US005789502A

United States Patent [19]

Shamshoum et al.

[11] Patent Number: 5,789,502
[45] Date of Patent: Aug. 4, 1998

[54] PROCESS FOR CO-POLYMERIZATION OF PROPYLENE AND ETHYLENE

[75] Inventors: Edwar S. Shamshoum, Houston; David J. Rauscher, Angleton; Theodore Harris, Houston; Thé Vu, Spring; Margarito Lopez, Pasadena, all of Tex.

[73] Assignee: Fina Technology, Inc., Dallas, Tex.

[21] Appl. No.: 837,831

[22] Filed: Apr. 22, 1997

[51] Int. Cl.$^6$ .......................... C08F 4/648; C08F 210/06
[52] U.S. Cl. .......................... 526/129; 526/153; 526/160; 526/164; 526/348; 526/905
[58] Field of Search ........................... 526/129, 153, 526/160, 164, 905

[56] References Cited

U.S. PATENT DOCUMENTS

| | | | |
|---|---|---|---|
| 4,897,455 | 1/1990 | Welborn, Jr. ........................... | 526/129 |
| 5,308,816 | 5/1994 | Tsutsui et al. ........................ | 526/129 X |
| 5,616,665 | 4/1997 | Jejelowo et al. ...................... | 526/129 |

*Primary Examiner*—Fred Teskin
*Attorney, Agent, or Firm*—Jim Wheelington; M. Norwood Cheairs

[57] ABSTRACT

The present invention provides a process for control of desired properties in the polymer product. The catalyst system used in the process includes a supported metallocene catalyst precursor in combination with an oxyorganoaluminum. The process can be applied to the co-polymerization of propylene and ethylene. The randomness of the ethylene incorporation of the co-polymer product is increased as the amount of ethylene in the feed is increased. The amount of ethylene in the feed is up to 6 wt. % with a resulting amount of ethylene incorporated into the copolymer product up to 4 mole %.

25 Claims, No Drawings

PROCESS FOR CO-POLYMERIZATION OF PROPYLENE AND ETHYLENE

BACKGROUND

1. Technical Field:

The present invention provides a catalyst and a process for the co-polymerization of olefins, particularly ethylene and propylene, that increases incorporation of ethylene in the copolymer. The catalyst precursor is a metallocene compound of the formula:

$$R''_b(CpR_{5-b})(CpR'_{5-b})MR^*_{\nu-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. The metallocene compound is supported on silica treated with alumoxane and activated with an aluminum alkyl.

2. Description of Prior Art:

Catalyst systems for the co-polymerization of olefins are well known in the art. Typically, these systems include a conventional supported Ziegler-Natta polymerization catalyst component; a co-catalyst, usually an organoaluminum compound, to activate the catalyst component; and an electron donor compound as a stereoregulation control agent, primarily for the polymerization of olefins of three or more carbon atoms.

A Ziegler-Natta type polymerization catalyst is basically a complex derived from a halide of a transition metal, for example, titanium, chromium or vanadium with a metal hydride and/or a metal alkyl that is typically an organoaluminum compound. The catalyst component is usually comprised of a titanium halide supported on a magnesium compound complexed with an alkylaluminum. In such a total catalyst system, a co-catalyst activates the catalyst and provides the initiation of a polymer chain. The co-catalyst that works well with conventional supported Ziegler-Natta catalyst components is an organoaluminum compound, most typically a trialkylaluminum, such as triethylaluminum (TEAl) or triisobutylaluminum (TiBAl). Examples of other useful organoaluminum compounds include alkylaluminum dihalides or a dialkylaluminum halide.

An electron donor may be added for stereoselectivity control. An electron donor compound is used in the polymerization reaction to reduce the atactic form of the polymer thereby giving control of and increasing the production of isotactic polymers. The external electron donor acts as a stereoregulation control agent (SCA) to control the amount of atactic form of polymer produced. It may also increase the production of isotactic polymers. Organosilicon compounds are known in the art for use as electron donors. Preferred electron donors or selectivity control agents are of the general formula $SiR_m(OR")_{4-m}$ where R is an alkyl group, a cycloalkyl group, an aryl group or a vinyl group, R" is an alkyl group, m is 0–4, R may be the same or different, R" may be the same or different.

SUMMARY OF THE INVENTION

The present invention provides a process and catalyst for the co-polymerization of propylene and ethylene wherein the process includes using a particular type of catalyst which results in significant increases in the ethylene incorporation in co-polymerization of propylene and ethylene. The catalyst is a metallocene catalyst with the precursor of the catalyst being a neutral metallocene compound of the formula:

$$R''_b(CpR_{5-b})(CpR'_{5-b})MR^*_{\nu-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. The metallocene compound is activated as a catalyst by an ionic ionizing agent or co-catalyst, such as is an oxyorganoaluminum compound.

This invention provides a process for the co-polymerization of olefins. The process comprises: supporting the metallocene compound on an inert carrier treated with an oxyorganoaluminum compound, preferably an alumoxane; contacting the metallocene-alumoxane with an alkyl aluminum to form an active catalyst; and introducing the catalyst into a polymerization reaction zone containing the monomers.

DETAILED DESCRIPTION OF THE INVENTION

The present invention relates to the use of a particular catalyst for co-polymerization of propylene and ethylene. This catalyst system produces a co-polymer product with significantly higher ethylene incorporation than provided by a conventional supported Ziegler-Natta catalyst systems or unsupported heterogeneous metallocene catalyst systems.

It has been discovered that a particular catalyst significantly enhances the polymerization of ethylene and propylene comonomers. The catalyst comprises a metallocene catalyst precursor which generally contains two cyclopentadienyl rings, substituted or unsubstituted, which are coordinated to a transition metal. The cyclopentadienyl rings may be bridged or unbridged. The bridge if present increase the stereorigidity of the metallocene compound and resulting catalyst. Increased stereorigidity is generally preferred for polymerization of olefins of three carbon atoms or greater.

Metallocene catalysts can be generally defined as a metal derivative of cyclopentadiene, which has been ionized to form an active cationic metallocene catalyst. The metallocene compound is of the general formula:

$$R''_b(CpR_{5-b})(CpR'_{5-b})MR^*_{\nu-2}$$

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M. The metallocene catalyst may be either isospecific or syndiospecific. For an isospecific catalyst, each $(CpR_{5-b})$ and $(CpR'_{5-b})$ are preferably the same and, more preferably, are a cyclopentadienyl or indenyl ring, substituted or unsubstituted. An illustrative examples of the metallocene compound is dimethylsilylidenebis (2-methylindenyl)zirconium dichloride. In the alternative, for an isospecific catalyst (CpR'$_{5-b}$) is a sterically different substituted cyclopentadienyl ring than (CpR'$_{5-b}$) in which one cyclopentadienyl ring is an unsubstituted fluorenyl and one and only one of the distal positions of the other cyclopentadienyl rings has a bulky group as a substituent having a spatial displacement greater than a methyl (CH$_3$) group and, more preferably, having a spatial displacement equal to or greater than a t-butyl group (CH$_3$CH$_3$CH$_3$C—) as disclosed in U.S. Pat. No. 5,416,228, issued May 16, 1995, hereby incorporated by reference. An illustrative examples of the metallocene compound is isopropylidene (3-t-butylcyclopentadienyl-1-fluorenyl) zirconium dichloride. For a syndiospecific catalyst, each (CpR$_{5-b}$) and (CpR'$_{5-b}$) are different so that bilateral symmetry exists at least for (CpR$_{5-b}$). CpR$_{5-b}$) is preferably unsubstituted cyclopentadienyl and (CpR'$_{5-b}$) is preferably fluorenyl, substituted or unsubstituted, with bilateral symmetry. One particular metallocene catalyst precursor which can be used in the present invention for the copolymerization of olefins is disclosed in U.S. Pat. Nos. 4,892,851; the disclosure of which is hereby incorporated. An illustrative example of the metallocene compound is isopropylidene(cyclopentadienyl-1-fluorenyl)zirconium dichloride.

Bilateral symmetry is defined as the condition in which there are no substituents or one or more substituents on one side and no substituents or one or more of the same substituents on the other side in the same relative position such that a mirror image is formed from one side to another. An illustration of a ligand with bilateral symmetry is shown below:

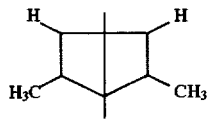

Bilateral symmetry is illustrated by a plane bisecting the ligand so that the right side is a mirror image of its left side.

Pseudobilateral symmetry is defined as symmetry such that a mirror image exists from one side to the other in regard to the existence and position of substituents but the substituents themselves are not identical. Pseudobilateral symmetry is illustrated by a plane bisecting the ligand with the substituents being in the same relative position on each side of the plane, i.e., forming a mirror image as to location of substituents on the substituted cyclopentadienyl ring, but the substituents are not the same. This is illustrated below:

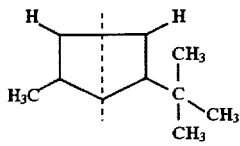

One embodiment of the present invention includes forming a supported metallocene catalyst on an inert, nonreactive support, such as silica which has been treated with an alumoxane. The supported metallocene catalyst can be suspended in an inert liquid carrier, such as mineral oil, contacted with a trialkylaluminum co-catalyst, such as triisobutyl aluminum, and introduced into a polymerization reaction zone which contains a monomer. Materials and procedures for making a supported metallocene catalyst are disclosed in copending application Ser. No. 08/503,765 (Attorney Docket no. COS685), filed Jul. 18, 1995, hereby incorporated by reference.

The support should be an inert solid which is chemically unreactive with any of the components of the metallocene catalyst. The support is preferably silica. One example of silica operative in this invention is chromatography grade silica. The support is preferably silica having high surface area in a range from 200 m$^2$/g to 800 m$^2$/g and small average pore volume in a range from 0.70 ml/g to 1.6 ml/g. One example of silica operative in this invention is chromatography grade silica. The preferred silicas are sold under the tradenames Ashi Olin H-121, Fuji Silica P-10, Q-6 and G-6. The preferred silica for isospecific metallocene is P-10 (average particle size 25 microns) and the preferred silica for syndiospecific for syndiospecific is H-121 (average particle size 12 microns).

The silica may be treated with methylalumoxane (MAO) in the following manner: The silica has water removed to a level of approximately 0.5%–1.0%. The dried silica is slurried in a hydrocarbon solvent. A solution of alumoxane in solvent was added to the silica slurry. After heating and subsequently cooling the slurry, the solid (silica treated with alumoxane) is separated out and (optionally) dried. The alumoxane is present at approximately 0.6 gram per gram of silica.

The metallocene may be contacted with the MAO-treated silica to form a supported metallocene catalyst in the following manner: A solution of metallocene in a hydrocarbon solvent is added to a slurry of silica treated with alumoxane also in a hydrocarbon solvent, preferably the same solvent as the metallocene solution and maintained at a set temperature. The solid, metallocene supported on silica treated with alumoxane, is separated out and dried. The metallocene is present at 0.5 to 3.0% by weight, preferably approximately 2% by weight.

A suspension may be formed with the supported metallocene catalyst in an inert liquid carrier, such as mineral oil. The liquid carrier is selected based on the following properties:

1. The liquid does not dissolve the solid catalyst component.
2. The liquid has minimal chemical interaction with the catalyst component.
3. The liquid is preferably an inert hydrocarbon.
4. The liquid only "wets" the catalyst component.
5. The liquid has sufficient viscosity to maintain the catalyst component in suspension without excessive agitation. Liquids which would be effective in this invention would be long chain hydrocarbons, such as mineral oil and polyisobutylene. This listing is not intended to be complete and all inclusive but is merely made to show examples of useful liquid media.

A co-catalyst is utilized to aid in the activation of the catalyst for the polymerization reaction. The most commonly used co-catalyst is an organoaluminum compound which is usually an alkyl aluminum. The aluminum alkyl is of the general formula AlR'$_3$ where R' is an alkyl of from 1–8 carbon atoms or a halogen and R' may be the same or different with at least one R$^1$ being an alkyl. Examples of aluminum alkyls are trimethyl aluminum (TMA), triethyl aluminum (TEAl), triisobutyl aluminum (TiBAl) and diethyl aluminum chloride (DEAC). The preferred co-catalysts an aluminum trialkyl, specifically TEAl or triisobutyl aluminum ("TIBAl").

Ethylene incorporation in polypropylene introduces defects into the polymer chain and alters the thermal and mechanical properties of the polymer.

The present invention provides a process for the co-polymerization of propylene and ethylene using the catalyst precursor described by the above formula comprising:
a) selecting a metallocene catalyst precursor for the copolymerization of propylene and ethylene;
b) supporting the metallocene compound on an inert carrier which has been treated with an alumoxane;
c) contacting the supported metallocene-alumoxane with an alkylaluminum compound to activate the catalyst;
d) introducing the catalyst into a polymerization reaction zone containing propylene and ethylene and
e) extracting co-polymer product from the reactor.

The invention having been generally described, the following examples are given as particular embodiments of the invention and to demonstrate the practice and advantages thereof. It is understood that the examples are given by way of illustration and are not intended to limit the specification or the claims to follow in any manner. The following Examples and Comparative Examples illustrate the present invention and its various advantages in more detail. The results are summarized in Tables 1 and 2.

EXAMPLE 1

SUPPORTED METALLOCENE

The reactor was cleaned, dried and purged. Heptane (800 ml) was added using nitrogen pressure. Flows of propylene and hydrogen were begun to the reactor. The propylene flow was at 4.0 liters per minute. The propylene was converted from a liquid to a gas with an inline vaporized regulator. The hydrogen flow was 80 cubic centimeters per minute (2% of the total flow by volume). After the stirrer was started and the pressure reached approximately 70 psig, the catalyst components were charged into a bomb.

90 mg of catalyst [dimethylsilylidenebis(2-methylindenyl) zirconium dichloride supported on MAO treated silica] were mixed in 3.5 ml of mineral oil and 1.5 ml of 0.89M TiBAl. From this suspension a 2.0 ml aliquot was taken and syringed into the bomb. The total amount of catalyst components used was 36.0 mg of catalyst and 108 mg of TiBAl. The bomb was attached to the reactor and the contents were charged using 200 ml of dry heptane. The flow of ethylene was begun at 20 cc/min (0.5% of the total flow by volume/mole). The reactor temperature was increased to 60° C. After one hour of polymerization, the flow of gases were stopped and the reactor was slowly vented. The heptane was removed by rotoevaporation or atmosphere evaporation. The polymer was vacuum dried. The weight percentage of ethylene incorporated into the polymer was determined by infrared analysis of pressed films and the intensity measurement of methylene peaks at 722 and 732 wavenumbers.

SUMMARY OF POLYMERIZATION CONDITIONS

Wt. of Catalyst Component: 90 mg
Amount of TiBAl (Activator): 108 mg
Hydrogen Flow: 80 cc/min
Propylene Flow: 4.0 L/min
Ethylene Flow: 20 cc/min
Temp.: 60° C.
Time: 60 mins.
Heptane: 1 liter

EXAMPLE 2

The procedures of Example 1 were repeated with the exception that the flow of ethylene in the reactor feed was increased to 1 mole %.

EXAMPLE 3

The procedures of Example 1 were repeated with the exception that the mole % of ethylene in the reactor feed was increased to 3 mole %.

EXAMPLE 4

The procedures of Example 1 were repeated with the exception that the metallocene catalyst precursor was diphenylmethylidene (cyclopentadienyl-1-fluorenyl)zirconium dichloride and the mole % of ethylene in the reactor feed was 2 mole %.

EXAMPLE 5

The procedures of Example 4 were repeated with the exception that the mole % of ethylene in the reactor feed was 4 mole %.

EXAMPLE 6

The procedures of Example 4 were repeated with the exception that the mole % of ethylene in the reactor feed was 6 mole %.

Comparative Example 1

CONVENTIONAL Z-N CATALYST

The reactor was cleaned, dried and purged. Heptane (800 ml) was added using nitrogen pressure. Flows of propylene and hydrogen were begun to the reactor. The propylene flow was at 4.0 liters per minute. The propylene was converted from a liquid to a gas with an inline vaporized regulator. The hydrogen flow was 80 cubic centimeters per minute (2% of the total flow by volume). After the stirrer was started and the pressure reached approximately 70 psig, the catalyst components were mixed in a bomb.

A catalyst mineral oil slurry was made with 100 mg of catalyst component in 10 ml of mineral oil. The catalyst component was a commericially available Ziegler-Natta catalyst component sold under the tradename THC-32A by Toho Titanium and disclosed in U.S. Pat. Nos. 4,816,433 and 4,839,321. 1 mmol of triethylaluminum (TEAl) and 0.1 mmol of cyclohexylmethyldimethoxysilane (CMDS) were added to a bomb followed by 1 ml of catalyst slurry (10 mg of catalyst). The bomb was attached to the reactor and the contents were charged using 200 ml of dry heptane. The flow of ethylene was begun at 80 cc/min (4% of the total flow by volume/mole). The reactor temperature was increased to 70° C. After one hour of polymerization, the flow of gases were stopped and the reactor was slowly vented. The heptane was removed by rotoevaporation or atmosphere evaporation.

SUMMARY OF POLYMERIZATION CONDITIONS

Wt. of Catalyst Component: 10 mg
Amount of TEAl (Co-Catalyst): 1 mmol
Amount of CMDS (Electron Donor): 0.1 mmol
Hydrogen Flow: 80 cc/min
Propylene Flow: 4.0 L/min
Ethylene Flow: 20 cc/min
Temp.: 70° C.
Time: 60 mins.
Heptane: 1 liter

Comparative Example 2

The procedures of Comparative Example 1 were repeated with the exception that 4 mole % of ethylene was fed into the reactor.

Comparative Example 3

The procedures of Comparative Example 1 were repeated with the exception that 6 mole % of ethylene was fed into the reactor.

Comparative Example 4

The procedures of Comparative Example 1 were repeated with the exception that 6 mole % of ethylene was fed into the reactor.

Comparative Example 5

UNSUPPORTED METALLOCENE

The reactor was cleaned, dried and purged. Heptane (800 ml) was added using nitrogen pressure. The flow of propylene was begun to the reactor. The propylene flow was at 4.0 liters per minute. The propylene was converted from a liquid to a gas with an inline vaporized regulator. After the stirrer was started and the pressure reached approximately 70 psig, the catalyst components were mixed in a bomb.

1.0 mg of catalyst was mixed with 5.0 ml of MAO. The solution was syringed into a bomb and then charged into the reactor using 200 ml of dry heptane. The flow of ethylene was begun at 80 cc/min (2% of the total flow by volume). The reactor temperature was increased to 60° C. After one hour of polymerization, the flow of gases were stopped and the reactor was slowly vented. The polymer was soluble in heptane. Methanol was added and the polymer was precipitated, filtered and vacuum dried.

SUMMARY OF POLYMERIZATION CONDITIONS

Wt. of Catalyst Component: 1.0 mg
Amount of MAO (Co-Catalyst): 5.0 ml
Ethylene Flow 80 cc/min
Propylene Flow 4 L/min
Temp. 60° C.
Time: 60 mins.
Heptane: 1 liter

Comparative Example 6

The procedures of Comparative Example 5 were repeated with the exception that 4 mole % of ethylene was fed into the reactor.

Comparative Example 7

The procedures of Comparative Example 5 were repeated with the exception that 6 mole % of ethylene was fed into the reactor.

Comparative Example 8

The procedures of Comparative Example 5 were repeated with the exception that unsupported Et[Ind]$_2$ZrCl$_2$ was the catalyst into the reactor.

Comparative Example 9

The procedures of Comparative Example 6 were repeated with the exception that unsupported Et[Ind]$_2$ZrCl$_2$ was the catalyst into the reactor.

Comparative Example 10

The procedures of Comparative Example 7 were repeated with the exception that unsupported Et[Ind]$_2$ZrCl$_2$ was the catalyst into the reactor.

Comparative Example 11

The procedures of Comparative Example 5 were repeated with the exception that unsupported Et[Ind]$_2$ZrCl$_2$ was the catalyst into the reactor.

Comparative Example 12

The procedures of Comparative Example 6 were repeated with the exception that unsupported Et[Ind]$_2$ZrCl$_2$ was the catalyst into the reactor.

Comparative Example 13

The procedures of Comparative Example 7 were repeated with the exception that unsupported Et[Ind]$_2$ZrCl$_2$ was the catalyst into the reactor.

TABLE 1

| Example | Mole % C$_2$ | % Ethylene in product (wt %) | Randomness Factor |
|---|---|---|---|
| Supported Me$_2$Si[2-MeInd]$_2$ZrCl$_2$ | | | |
| 1 | 0.5 | 0.4 | 1.06 |
| 2 | 1 | 1.6 | 3.1 |
| 3 | 3 | 3.54 | 3.6 |
| Supported Ph$_2$C[Cp-Flu]ZrCl$_2$ | | | |
| 4 | 2 | 2.2 | 0.7 |
| 5 | 4 | 3.2 | 1.5 |
| 6 | 6 | 4.2 | 1.9 |

TABLE 2

| Comparative Example | Mole % C$_2$ in feed | % Ethylene in product (wt %) | Randomness Factor |
|---|---|---|---|
| Conventional Ziegler-Natta Catalyst | | | |
| 1 | 2 | 1.6 | 5.2 |
| 2 | 4 | 3.0 | 2.6 |
| 3 | 6 | 4.5 | 1.7 |
| 4 | 8 | 5.9 | 1.1 |
| Unsupported Me$_2$Si[2-MeInd]$_2$ZrCl$_2$ | | | |
| 5 | 2 | 2.5 | 21.5 |
| 6 | 4 | 4.9 | 5.6 |
| 7 | 6 | 6.6 | 4.1 |
| Unsupported Et[Ind]$_2$ZrCl$_2$ | | | |
| 8 | 2 | 1.2 | Infinity |
| 9 | 4 | 2.4 | 120 |
| 10 | 6 | 3.3 | 11.5 |
| Unsupported iPr[Cp-Flu]ZrCl$_2$ | | | |
| 11 | 2 | 1.5 | Infinity |
| 12 | 4 | 2.9 | 7.5 |
| 13 | 6 | 4.3 | 4.6 |

The data demonstrates that an unsupported metallocene catalyst gives better ethylene incorporation and randomness than a conventional Ziegler-Natta catalyst and that a supported metallocene catalyst gives ethylene incorporation as good as an unsupported metallocene catalyst (and better than for a conventional Ziegler-Natta catalyst) but randomness not as good as an unsupported metallocene catalyst (but as good as a conventional Ziegler-Natta catalyst):
Ethylene incorporation:
 UMC=SMC>CZNC
Randomness:
UMC—Unsupported Metallocene Catalyst
SMC—Supported Metallocene Catalyst CZNC—Conventional Ziegler-Natta Catalyst The most significant unexpected result obtained from the supported metallocene catalyst is the increase in randomness of ethylene incorporation in the co-polymer as the amount of ethylene in the feed is increased up to 6 mole percent, specifically 0.5 to 6 mole percent. This result is directly contrary to the trend established by the unsupported metallocene catalyst and the conventional Ziegler-Natta catalyst.

Supported Metallocene Catalyst:
Ethylene in feed Randomness
Unsupported Metallocene Catalyst:

$$\text{Ethylene in feed} \propto \frac{1}{\text{Randomness}}$$

Conventional Ziegler-Natta Catalyst:

$$\text{Ethylene in feed} \propto \frac{1}{\text{Randomness}}$$

The supported metallocene catalyst system is shown to be effective at ethylene incorporation levels of up to about 6 weight percent ethylene, preferably, 1.5 to 6.0 weight percent ethylene. The supported metallocene catalyst increases the randomness of ethylene incorporation in comparison to conventional supported Ziegler-Natta catalyst or a heterogeneous (unsupported) metallocene catalyst at an ethylene content in the feed up to 4 mole % ethylene.

The process of the present invention will be effective to produce a co-polymer product having a wt. % of ethylene incorporation of up to about 6%. The process of the present invention will more preferably be used to produce a co-polymer having a wt. % of ethylene incorporation of 1.5 to 6.0%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letter of patent of the United States of America is:

1. A process for the co-polymerization of propylene and ethylene, comprising:

(a) selecting a metallocene catalyst precursor of the formula:

where R" is a bridge imparting stereorigidity to the structure to the metallocene by connecting the two cyclopentadienyl rings, b is 1 or 0 indicating whether the bridge is present or not, Cp is a cyclopentadienyl ring, R and R' are substituents on the cyclopentadienyl rings and can be a hydride or a hydrocarbyl from 1–9 carbon atoms, each R and R' being the same or different, M is a Group IIIB, IVB, VB or VIB metal, R* is a hydride, a halogen or a hydrocarbyl from 1–20 carbon atoms, v is the valence of M;

wherein the metallocene catalyst precursor is supported on a silica treated with an oxyorganoaluminum compound;

(b) contacting the supported metallocene catalyst precursor with a co-catalyst to activate the catalyst precursor as a catalyst;

(c) introducing said catalyst into a polymerization reaction zone containing propylene and ethylene wherein the ethylene is present up to 6 mole percent; and (e) withdrawing a co-polymer product.

2. The process of claim 1 wherein the metallocene in step (a) is present at 0.5 to 3.0% by weight.

3. The process of claim 2 wherein the metallocene is present at approximately 2% by weight.

4. The process of claim 1 wherein the silica has an average particle size of 25 microns.

5. The process of claim 1 wherein the silica has an average particle size of 12 microns.

6. The process of claim 1 wherein the co-catalyst is an aluminum alkyl or aluminum alkyl halide of the general formula $AlR'_3$ where R' is an alkyl of from 1–8 carbon atoms or a halogen and R' may be the same or different with at least one R' being an alkyl.

7. The process of claim 6 wherein the co-catalyst is trimethyl aluminum, triethyl aluminum, triisobutyl aluminum or diethyl aluminum chloride.

8. The process of claim 7 wherein the co-catalyst is triethyl aluminum or triisobutyl aluminum.

9. The process of claim 1 wherein said oxyorganoaluminum compound is an alumoxane.

10. The process of claim 1 wherein said oxyorganoaluminum compound is methylalumoxane.

11. The process of claim 1 wherein ethylene is present in a range from 0.5 to 6 mole percent.

12. The process of claim 1 wherein $(CpR_{5-b})$ and $(CpR'_{5-b})$ are the same.

13. The process of claim 12 wherein $(CpR_{5-b})$ and $(CpR'_{5-b})$ are a substituted indenyl.

14. The process of claim 1 wherein $(CpR_{5-b})$ and $(CpR'_{5-b})$ are different and have bilateral symmetry.

15. The process of claim 14 wherein $(CpR_{5-b})$ is an unsubstituted cyclopentadienyl and $(CpR'_{5-b})$ is a fluorenyl, substituted or unsubstituted.

16. The process of claim 1 wherein R" is of the general formula $rr"Si=$ where r and r" are each an alkyl or aryl group having 1–10 carbon atoms and may be the same or different and Si is silicon.

17. The process of claim 16 wherein r and r" are the same.

18. The process of claim 1 wherein M is a Group IVB metal.

19. The process of claim 18 wherein M is zirconium.

20. The process of claim 1 wherein R* is a halogen.

21. The process of claim 1 wherein R* is chlorine.

22. The process of claim 1 wherein the metallocene catalyst precursor is dimethylsilylidenebis(2-methylindenyl) zirconium dichloride.

23. The process of claim 1 wherein the metallocene catalyst precursor is diphenylmethylidene (cyclopentadienyl-1-fluorenyl) zirconium dichloride.

24. The process of claim 1 wherein the metallocene catalyst precursor is rac-ethylidenebis(indenyl)zirconium dichloride.

25. The process of claim 1 wherein said metallocene catalyst precursor is isopropylidene(cyclopentadienyl-1-fluorenyl)zirconium dichloride.

* * * * *